US011946458B2

(12) United States Patent
Kim

(10) Patent No.: US 11,946,458 B2
(45) Date of Patent: Apr. 2, 2024

(54) ENERGY CONVERSION APPARATUS

(71) Applicant: Byeongsik Kim, Seoul (KR)

(72) Inventor: Byeongsik Kim, Seoul (KR)

( * ) Notice: Subject to any disclaimer, the term of this patent is extended or adjusted under 35 U.S.C. 154(b) by 0 days.

(21) Appl. No.: 17/623,136

(22) PCT Filed: Jun. 25, 2020

(86) PCT No.: PCT/KR2020/008263
§ 371 (c)(1),
(2) Date: Dec. 27, 2021

(87) PCT Pub. No.: WO2020/262975
PCT Pub. Date: Dec. 30, 2020

(65) Prior Publication Data
US 2022/0228573 A1 Jul. 21, 2022

(30) Foreign Application Priority Data

Jun. 27, 2019 (KR) .......... 10-2019-0077110

(51) Int. Cl.
*F03G 7/04* (2006.01)
(52) U.S. Cl.
CPC ..................... *F03G 7/04* (2013.01)
(58) Field of Classification Search
CPC .......... F03G 7/04; F01B 11/001; F01B 19/02; F01B 29/02; F01B 23/10; F01B 29/08; F01B 31/00; F01D 15/10
(Continued)

(56) References Cited

U.S. PATENT DOCUMENTS 2,146,176 A * 2/1939 Donaldson, Jr. ................ 236/82
2,773,482 A * 12/1956 Dickie .................... G01M 7/04
92/39
(Continued)

FOREIGN PATENT DOCUMENTS

CN 105863737 A 8/2016
CN 107210647 A 9/2017
(Continued)

OTHER PUBLICATIONS

Supplemental European Search Report for counterpart European Application No. 20831027.6, dated Jun. 10, 2022.
(Continued)

*Primary Examiner* — Hoang M Nguyen
(74) *Attorney, Agent, or Firm* — United One Law Group LLC; Kongsik Kim; Jhongwoo Peck

(57) ABSTRACT

According to an exemplary embodiment of the present invention, since the pressure space of the cylinder is bisected into a vacuum state and a pneumatic state to alternately form a pressure difference, it is possible to generate the kinetic energy of the piston and convert the kinetic energy into other necessary energy. To this end, an exemplary embodiment of the present invention provides an energy conversion apparatus including an energy conversion module including a piston, a piston rod provided on one side of the center of the piston, a cylinder divided into a first pressure space and a second pressure space to be relatively varied with the piston interposed therebetween, and an external air opening/closing part selectively opening and closing the external air to the first pressure space and the second pressure space, respectively; a first bellows containing a fluid therein and provided in the first pressure space to be compressed and expanded; a second bellows containing a fluid therein and provided in the second pressure space to be compressed and expanded; a fluid movement pipe which is positioned outside the
(Continued)

cylinder and connects the first bellows and the second bellows to each other to form a closed space, and through which the fluid accommodated therein moves by pressure; a first bellows pressing part for pressing one side of the first bellows; second bellows pressing part for pressing one side of the second bellows; a first motor transmitting a driving force to the first bellows pressing part; and a second motor transmitting a driving force to the second bellows pressing part.

7 Claims, 4 Drawing Sheets

(58) Field of Classification Search
USPC .... 60/325, 370, 407, 698; 91/462, 465, 165, 91/166; 92/34–47
See application file for complete search history.

(56) References Cited

U.S. PATENT DOCUMENTS

| | | | | |
|---|---|---|---|---|
| 2,917,751 | A | * | 12/1959 | Fry ................... A61M 60/441 623/3.18 |
| 3,014,460 | A | * | 12/1961 | Randol ................. B62D 5/16 92/39 |
| 4,052,849 | A | * | 10/1977 | Dumbaugh ............ F16H 43/00 290/1 R |
| 5,141,412 | A | | 8/1992 | Meinz |
| 5,558,506 | A | | 9/1996 | Simmons et al. |
| 2004/0159100 | A1 | * | 8/2004 | Bernard ................. B64C 13/12 60/325 |
| 2013/0272905 | A1 | | 10/2013 | Shelke |

FOREIGN PATENT DOCUMENTS

| | | |
|---|---|---|
| EA | 201100808 A1 | 10/2012 |
| EA | 33371 B1 | 10/2019 |
| JP | 10-067334 A | 3/1998 |
| KR | 20-1998-0020522 U | 5/2000 |
| KR | 20-2000-0008716 U | 5/2000 |
| KR | 10-0304863 B1 | 10/2001 |
| KR | 10-2003-0021904 A | 3/2003 |
| KR | 10-2018-0005151 A | 1/2018 |
| RU | 2352786 C1 | 4/2009 |
| SU | 1670171 A1 | 8/1991 |

OTHER PUBLICATIONS

Examination Report for counterpart Indian Application No. 202217004348, dated Apr. 12, 2022.
Office Action for counterpart Russian Application No. 2022101688, dated Oct. 31, 2022.
Search Report for counterpart Russian Application No. 2022101688, dated Oct. 31, 2022.
Office Action for counterpart Canadian Application No. 3,145,392, dated Feb. 15, 2023.
Examination Report No. 1 for counterpart Australian Application No. 2020306522, dated Apr. 14, 2023.

* cited by examiner

'A'

ENERGY CONVERSION APPARATUS

CROSS-REFERENCE TO RELATED APPLICATIONS

This application is a National Stage Entry of International Application PCT/KR2020/008263 filed on Jun. 25, 2020, which claims priority to Korean Application 10-2019-0077110 filed on Jun. 27, 2019. The aforementioned applications are incorporated herein by reference in their entireties.

TECHNICAL FIELD

The present invention relates to an energy conversion apparatus using a pressure difference.

BACKGROUND ART

A vacuum state or vacuum-like state (low vacuum) and a pneumatic state or compressed pneumatic state opposite thereto may be used as a means capable of generate kinetic energy and electrical power energy. That is, if a vacuum is artificially generated on one side and a high-pressure state is formed on the other side with a piston in a cylinder interposed therebetween, the reciprocating motion of the piston may be induced due to a pressure difference therebetween, and electric power is generated using this reciprocating motion.

As a similar invention to the prior art, there is Korean Patent Registration No. 0304863 "Energy storage and conversion apparatus" that generates hydraulic pressure through pneumatic pressure and stores and converts energy into the generated hydraulic pressure and pneumatic pressure. Korean Patent Registration No. 0304863 relates to a technology for generating hydraulic pressure by a hydraulic pressure converter using a compressed air tank and generating energy suitable for use by operating a pneumatic pressure using means and a hydraulic pressure using means.

However, the conventional inventions are focused on pneumatic/hydraulic pressure conversion using stored compressed air, but there is disclosed no configuration for maximizing a pressure difference generating a piston reciprocating motion or no efficient method for forming a pressure difference.

Therefore, there is a need for research on an energy conversion apparatus capable of easily configuring a pneumatic difference while configuring the reciprocating motion of the piston to be interlocked.

SUMMARY

The present invention has been derived based on the above necessity, and a first object of the present invention is to provide an energy conversion apparatus capable of generating and converting kinetic energy by bisecting a pressure space of a cylinder into a vacuum state and a pneumatic state to form alternately a pressure difference.

A second object of the present invention is to provide an energy conversion apparatus capable of efficiently forming a pressure difference in a bisected pressure space of a cylinder by inserting bellows into a bulky cylinder to occupy a volume.

A third object of the present invention is to provide an energy conversion apparatus capable of efficiently forming a vacuum in a cylinder space by inserting a pair of bellows into each of bisected spaces of a bulky cylinder so that compression of one bellows and expansion of the other bellows are interlocked with each other.

A fourth object of the present invention is to provide an energy conversion apparatus capable of generating a vacuum state by placing a pressing part on a pair of bellows inserted into bisected spaces of a cylinder.

An exemplary embodiment of the present invention provides an energy conversion apparatus including an energy conversion module including a piston, a piston rod provided on one side of the center of the piston, a cylinder divided into a first pressure space and a second pressure space to be relatively varied with the piston interposed therebetween, and an external air opening/closing part selectively opening and closing the external air to the first pressure space and the second pressure space, respectively; a first bellows containing a fluid therein and provided in the first pressure space to be compressed and expanded; a second bellows containing a fluid therein and provided in the second pressure space to be compressed and expanded; a fluid movement pipe which is positioned outside the cylinder and connects the first bellows and the second bellows to each other to form a closed space, and through which the fluid accommodated therein moves by pressure; a first bellows pressing part for pressing one side of the first bellows; second bellows pressing part for pressing one side of the second bellows; a first motor transmitting a driving force to the first bellows pressing part; and a second motor transmitting a driving force to the second bellows pressing part.

The first bellows and the second bellows may be mounted inside both ends of the cylinder, respectively, have a hollow formed in an axial direction of the piston rod, and may be formed as a fluid accommodating part having elasticity.

In each of the first bellows and the second bellows, barriers may be formed so that two or more compartments are formed therein, and a fluid movement hole may be formed in the barrier.

The first bellows pressing part may include a first tension rod which is mounted to slide along an outer circumferential surface of the piston rod in the first pressure space and transmits the tension for pressing and a first pressure plate formed by bending at an end toward the piston of the first tension rod and pressing and compressing the first bellows in an axial direction of the piston rod.

The second bellows pressing part may include a second tension rod which is disposed in the axial direction of the piston rod in the second pressure space and transmits the tension for pressing and a second pressure plate formed by bending at an end toward the piston of the second tension rod and pressing the second bellows in the axial direction of the piston rod.

The energy conversion apparatus may further include a cylinder tank configured to accommodate the energy conversion module therein, and accommodate the external air as compressed air.

According to an exemplary embodiment of the present invention, since the pressure space of the cylinder is bisected into a vacuum state and a pneumatic state to alternately form a pressure difference, it is possible to generate the kinetic energy of the piston and convert the kinetic energy into other necessary energy.

In addition, in the energy conversion apparatus, since bellows are inserted into a bulky cylinder to occupy a volume, it is possible to efficiently form a pressure difference between bisected pressure spaces of the cylinder.

In addition, it is possible to efficiently form a vacuum in a cylinder space by inserting a pair of bellows into each of bisected spaces of a bulky cylinder so that compression of one bellows and expansion of the other bellows are interlocked with each other.

Meanwhile, it is possible to generate a vacuum state without a vacuum pump by placing a pressing part on a pair of bellows inserted in bisected spaces of the cylinder.

DETAILED DESCRIPTION

Figure 1:
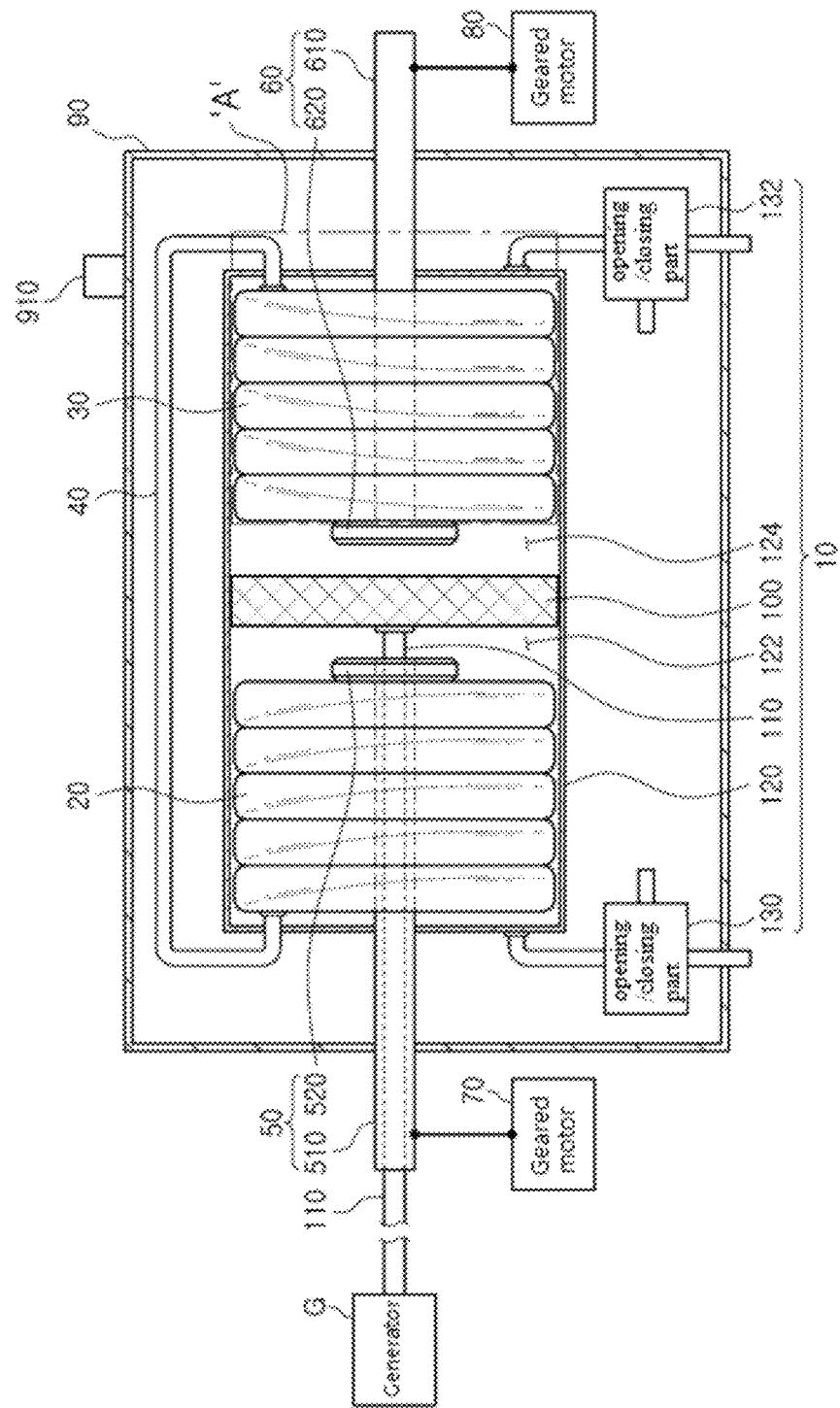
FIG. 1 is a structural diagram schematically illustrating a cross-sectional structure of an exemplary embodiment of an energy conversion apparatus according to the present invention.

Hereinafter, exemplary embodiments of the present invention will be described in detail with reference to the accompanying drawings and the contents disclosed in the accompanying drawings, but the present invention is not limited or restricted to the exemplary embodiments.

Various modifications may be made to example exemplary embodiments to be described below. Example exemplary embodiments to be described below are not intended to be limited to aspects and should be understood to include all modifications, equivalents, and substitutes thereof.

Meanwhile, in describing the present invention, detailed description of associated known function or constitutions will be omitted if it is determined that they unnecessarily make the gist of the present invention unclear. Terminologies used herein are a terminologies used to properly express exemplary embodiments of the present invention, which may vary according to a user, an operator's intention, or customs in the art to which the present invention pertains. Accordingly, definitions of the terminologies need to be described based on contents throughout this specification.

In addition, in the description with reference to the accompanying drawings, like components regardless of reference numerals designate like reference numerals and a duplicated description thereof will be omitted. In describing the example exemplary embodiments, a detailed description of related known technologies will be omitted if it is determined that they unnecessarily make the gist of the example exemplary embodiments unclear.

Energy Conversion Apparatus

In an exemplary embodiment of an energy conversion apparatus of the present invention, a cylinder pressure space in a vacuum state (a low vacuum state of $10^{-3}$ Torr or more) and a pneumatic state equal to atmospheric pressure or a compressed pneumatic state in which compressed air is filled are generated to implement a reciprocating motion of a piston disposed therebetween and generate kinetic energy according to a pressure difference and generate electric power energy using the same.

Figure 2:
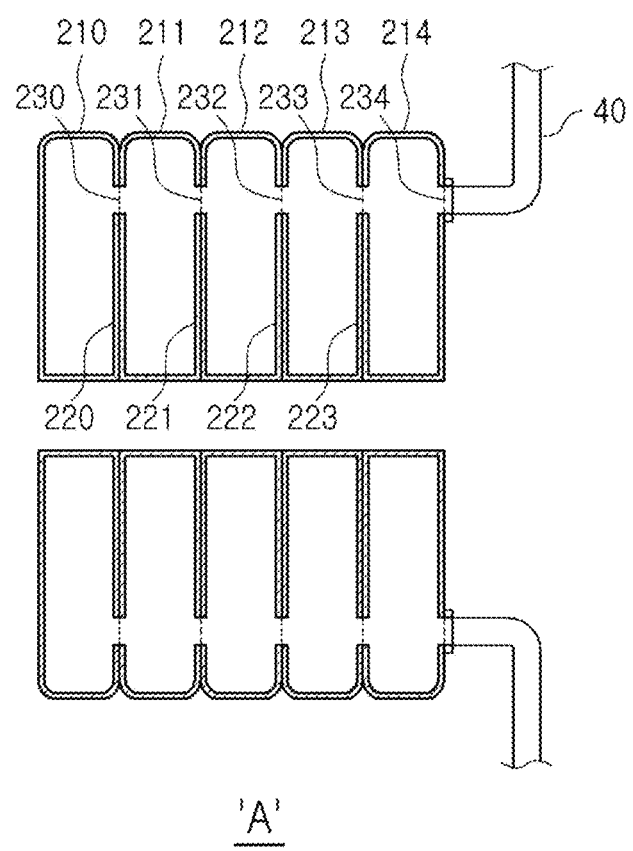
FIG. 2 is a cross-sectional view illustrating a cross section of bellows A of a configuration of an exemplary embodiment of an energy conversion apparatus of the present invention.

FIG. 1 is a structural diagram schematically illustrating a cross-sectional structure of an exemplary embodiment of an energy conversion apparatus according to the present invention and FIG. 2 is a cross-sectional view illustrating a cross section of bellows A of a configuration of an exemplary embodiment of an energy conversion apparatus of the present invention. Hereinafter, a configuration of the exemplary embodiment will be described in detail with reference to FIGS. 1 and 2.

As illustrated in FIG. 1, the exemplary embodiment is configured to include an energy conversion module 10 including a piston 100, a piston rod 110, a cylinder 120, and an external air opening/closing part 130, first and second bellows 20 and 30, a fluid movement pipe 40, first and second bellows pressing parts 50 and 60, and first and second motors 70 and 80. The exemplary embodiment may further include a tank 90 for accommodating the external air as compressed air in addition to the above-described configurations. Hereinafter, the configurations of the exemplary embodiment will be described in detail with reference to FIGS. 1 and 2.

The energy conversion module 10 may be configured to include a piston 100 reciprocates by a pressure difference, a piston rod 110 receiving a force from the piston 100 to transmit the force to a required energy generation means such as a generator G and the like, a cylinder 12 divided into a first pressure space 122 and a second pressure space 124 to be relatively varied with the piston 100 interposed therebetween, and an external air opening/closing part 130 selectively opening and closing the external air to the first pressure space 122 and the second pressure space 124, respectively.

Here, when the first external air opening/closing part 130 is closed in the first pressure space 122 in a vacuum state and a second external air opening/closing part 132 connected to the second pressure space 124 is opened, while the piston 100 moves to the first pressure space 122, kinetic energy is generated according to a pressure difference.

When the piston rod 110 moves in one direction, a vacuum pump (not illustrated) is connected through the first external air opening/closing part 130 to form a vacuum state in the first pressure space 122, and the second external air opening/closing part 132 is opened to form an atmospheric state in the second pressure space 124. Thereafter, when the piston rod 110 moves to an opposite direction, the vacuum pump (not illustrated) is connected through the second external air opening/closing part 132 to form a vacuum state in the second pressure space 124 and the first external air opening/closing part 130 is opened to form an atmospheric state in the first pressure space 122, thereby forming repeatedly and alternately a pressure difference in the bisected pressure spaces 122 and 124 of the cylinder 120.

However, when the compressed air is filled in the cylinder tank 90 and the external air is used as compressed air, the first and second external air opening/closing parts 130 and 132 are not opened and closed between the atmospheric pressures, but opened and closed inside the cylinder tank 90, thereby more strongly inducing the reciprocating motion of the piston 100.

If a vacuum state is completely formed in the first and second pressure spaces 122 and 124, the overload, capacity and power problems of the vacuum pump may occur, so that it is preferred that the first and second bellows 20 and 30 are provided in the first and second pressure spaces 122 and 124 to form a vacuum state.

The first and second bellows 20 and 30 contain a fluid therein and are provided in the first pressure space 122 and the second pressure space 124, respectively, to be compressed and expanded. In addition, the first bellows 20 and the second bellows 30 are mounted inside both ends of the cylinder 12, respectively, have a hollow formed in an axial direction of the piston rod 110, and are formed as a fluid accommodating part having elasticity.

Here, in the first bellows 20, as illustrated in FIG. 2, hollow tube-shaped compartments 210, 211, 212, 213, and 214 are partitioned by barriers 220, 221, 222, and 223, and the compartments 210, 211, 212, 213, and 214 may be connected to each other through fluid movement holes 230, 231, 232, 233, and 234 so that the fluid accommodated therein may move. In addition, the second bellows 30 may also be formed in the same shape as the first bellows 20.

However, the shapes of the first and second bellows 20 and 30 of the exemplary embodiment are illustrative, and the first and second bellows 20 and 30 may be configured in a spirally stacked form using a hollow and long single body. In this case, the fluid movement hole corresponds to the cross-sectional area of the single body, thereby more easily implementing the movement of the internal fluid.

The first bellows 20 and the second bellows 30 are connected each other to form a closed space and a fluid movement pipe 40 is positioned outside the cylinder 120 to move the fluid accommodated therein by pressure. The fluid accommodated therein is not limited to a single type, but oil or water may be used.

The first and second bellows pressing parts 50 and 60 serve to press one side of the first and second bellows 20 and 30, respectively, as illustrated in FIG. 1. The first and second bellows pressing parts 50 and 60 receive a driving force from first and second motors 70 and 80, respectively. As such a motor, a low-speed motor such as a geared motor may be used.

In addition, the first bellows pressing part 50 may include a first tension rod 510 which is mounted to slide along an outer circumferential surface of the piston rod 110 in the first pressure space and transmits the tension for pressing and a first pressure plate 520 formed by bending at an end toward the piston 100 of the first tension rod 510 and pressing and compressing the first bellows 20 in an axial direction of the piston rod 110. In addition, the second bellows pressing part 60 may include a second tension rod 610 which is disposed in the axial direction of the piston rod 110 in the second pressure space and transmits the tension for pressing and a second pressure plate 620 formed by bending at an end toward the piston 100 of the second tension rod 610 and pressing the second bellows 30 in the axial direction of the piston rod 110.

As a modification, although not illustrated, in addition to the first and second bellows 20 and 30, a third bellows may be interposed in the fluid movement pipe 40. Since the fluid movement from one bellows may be moved to the opposite bellows after accommodated in the third bellows, alternating compression and expansion of the first and second bellows 20 and 30 are performed at intervals to make it possible to larger form the first and second bellows 20 and 30.

Compression and Expansion of Bellows

Figure 3:
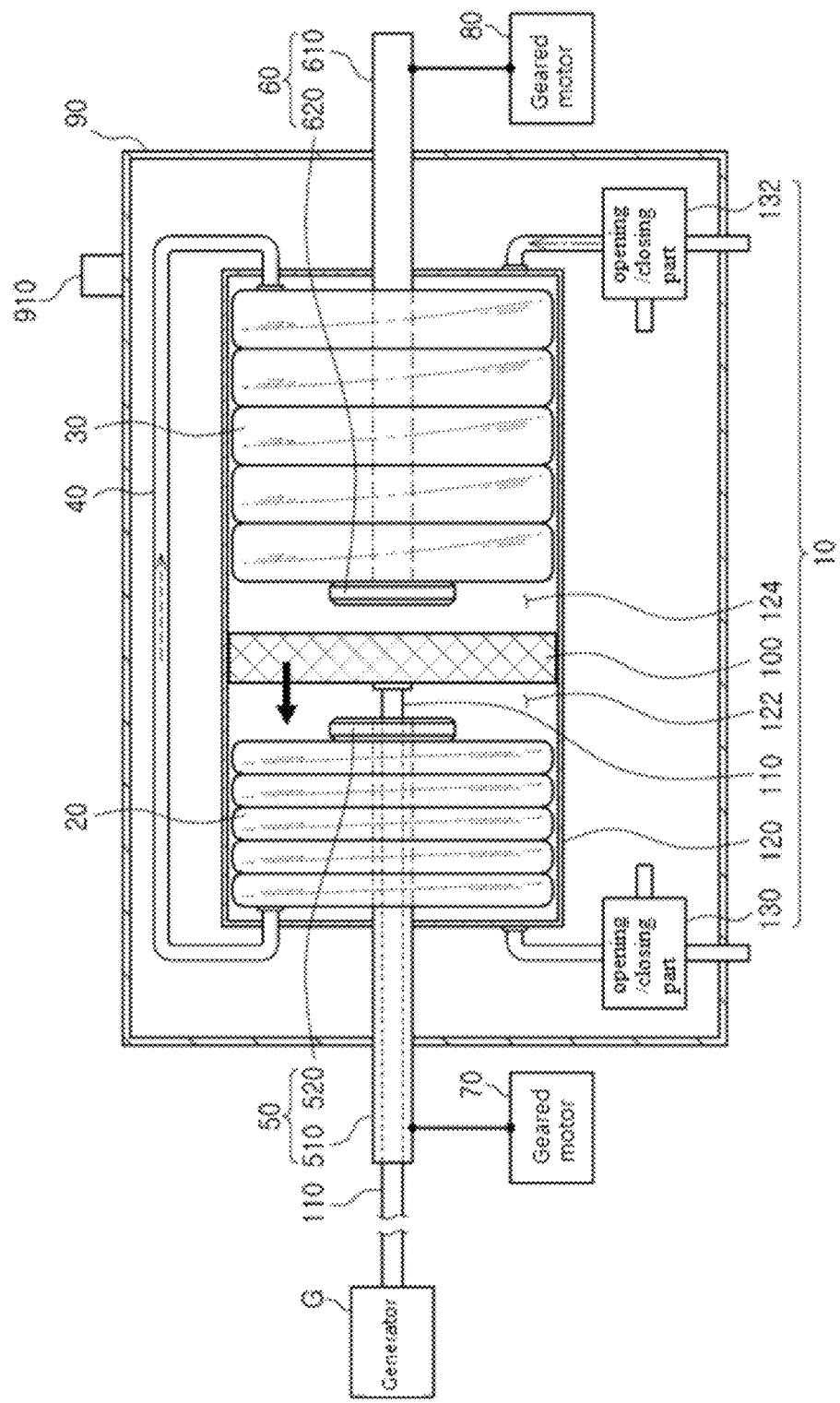
FIG. 3 is a diagram illustrating an operation state in one direction of an exemplary embodiment of an energy conversion apparatus of the present invention.

The first and second bellows pressing parts 50 and 60 are alternately operated and an operating state will be described with reference to FIGS. 3 and 4. FIG. 3 is a diagram illustrating an operation state in one direction of an exemplary embodiment of an energy conversion apparatus of the present invention, and FIG. 4 is a diagram illustrating an operation state in the other direction of an exemplary embodiment of an energy conversion apparatus of the present invention.

In the alternating operation of the first and second bellows pressing parts 50 and 60, as illustrated in FIG. 3, when the first bellows pressing part 50 presses and compresses the first bellows 20 while the first external air opening/closing part 130 is closed and the second external air opening/closing part 132 is opened, the piston 100 moves toward the first pressure space 122 in a vacuum state, and the fluid accommodated in the first bellows 20 is accommodated in the second bellows 30 through the fluid movement pipe 40.

Figure 4:
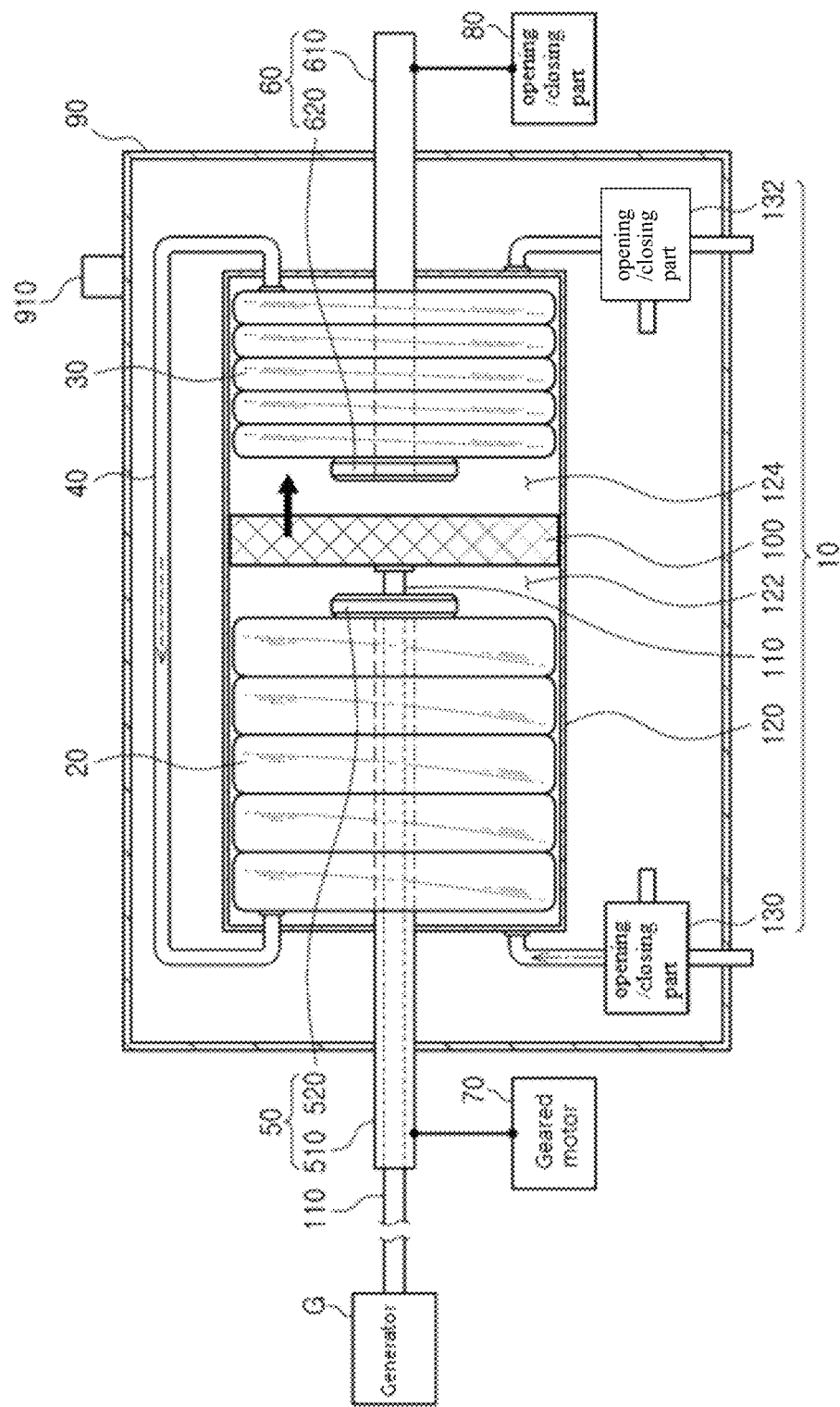
FIG. 4 is a diagram illustrating an operation state in the other direction of an exemplary embodiment of an energy conversion apparatus of the present invention.

On the contrary, as illustrated in FIG. 4, when the second bellows pressing part 60 presses and compresses the second bellows 30 while the second external air opening/closing part 132 is closed and the first external air opening/closing part 130 is opened, the piston 100 moves toward the second pressure space 124 in the vacuum state, and the fluid accommodated in the second bellows 30 is accommodated in the first bellows 20 through the fluid movement pipe 40.

The alternating compression and expansion of the first and second bellows 20 and 30 at the same time as the alternating opening and closing of the first and second external air opening/closing part 130 and 132 enables the alternating formation of the first and second pressing spaces 122 and 124 in the vacuum state and the external air state, thereby inducing the reciprocating motion of the piston 100 and allowing a generator G to be used for producing required energy. Here, the alternating compression and expansion of the first and second bellows 20 and 30 may be used independently without a vacuum pump (not illustrated), but may also be operated in conjunction with the formation of the vacuum state of the vacuum pump through the first and second external air opening/closing parts 130 and 132.

Hereinabove, the exemplary embodiments of the present invention have been described with the accompanying drawings, but it can be understood by those skilled in the art that technical configurations of the present invention can be executed in other detailed forms without changing the technical spirit or requisite features of the present invention. Therefore, it should be appreciated that the aforementioned exemplary embodiments are illustrative in all aspects and are not restricted. In addition, the scope of the present invention is indicated by the appended claims to be described below rather than the detailed description above. Further, it is to be understood that all changes or modifications derived from the meaning and scope of the appended claims and equivalent concepts thereof are included in the scope of the present invention.

EXPLANATION OF REFERENCE NUMERALS AND SYMBOLS

G: Generator
10: Energy conversion module
100: Piston
110: Piston rod
120: Cylinder
122: First pressure space
124: Second pressure space
130, 132: External air opening/closing parts
20: First bellows
210, 211, 212, 213, 214: Bellows compartment
220, 221, 222, 223: Bellows barrier
230, 231, 232, 233: Bellows fluid movement hole
30: Second bellows
40: Fluid movement pipe
50: First bellows pressing part
510: First tension rod
520: First pressing plate
60: Second bellows pressing part
610: Second tension rod
620: Second pressing plate
70: First motor 80: Second motor
90: Cylinder tank
910: Pressure air input pipe

The invention claimed is:

1. An energy conversion apparatus comprising:
an energy conversion module including:
   a piston;
   a piston rod provided on one side of the center of the piston;
   a cylinder divided into a first pressure space and a second pressure space to be relatively varied with the piston interposed therebetween;
   a first external air opening/closing part that selectively opens and closes external air to the first pressure space, wherein the external air being subject to a first pressure; and
   a second external air opening/closing part that selectively opens and closes the external air to the second pressure space;
a first bellows containing a fluid therein and provided in the first pressure space to be compressed and expanded;
a second bellows containing a fluid therein and provided in the second pressure space to be compressed and expanded;
a fluid movement pipe which is positioned outside the cylinder and connects the first bellows and the second bellows to each other to form a closed space, and through which the fluid accommodated therein moves by pressure;
a first bellows pressing part for pressing one side of the first bellows;
a second bellows pressing part for pressing one side of the second bellows;
a first motor transmitting a driving force to the first bellows pressing part; and
a second motor transmitting a driving force to the second bellows pressing part,
wherein the first external air opening/closing part is configured to connect the first pressure space selectively to the external air or to a vacuum state, the vacuum state being subject to a second pressure that is lower than the first pressure of the external air,
wherein the second external air opening/closing part is configured to connect the second pressure space selectively to the external air or to the vacuum state, and
wherein the first bellows and the second bellows are mounted inside both ends of the cylinder, respectively, such that when the first pressure space is at the vacuum state, the first bellows pressing part compresses the first bellows to transport the fluid inside the first bellows to the second bellows, and when the second pressure space is at the vacuum state, the second bellows pressing part compresses the second bellows to transport the fluid inside the second bellows to the first bellows.

2. The energy conversion apparatus of claim 1, wherein each of the first bellows and the second bellows includes a hollow formed in an axial direction of the piston rod.

3. The energy conversion apparatus of claim 1, wherein in each of the first bellows and the second bellows, barriers are formed so that two or more compartments are formed therein, and a fluid movement hole is formed in the barrier.

4. The energy conversion apparatus of claim 1, wherein the first bellows pressing part includes a first tension rod which is mounted to slide along an outer circumferential surface of the piston rod in the first pressure space and transmits the tension for pressing and a first pressure plate formed by bending at an end toward the piston of the first tension rod and pressing and compressing the first bellows in an axial direction of the piston rod.

5. The energy conversion apparatus of claim 1, wherein the second bellows pressing part includes a second tension rod which is disposed in the axial direction of the piston rod in the second pressure space and transmits the tension for pressing and a second pressure plate formed by bending at an end toward the piston of the second tension rod and pressing the second bellows in the axial direction of the piston rod.

6. The energy conversion apparatus of claim 1, further comprising:
a cylinder tank configured to accommodate the energy conversion module therein, and accommodate the external air as compressed air.

7. The energy conversion apparatus of claim 1, wherein the second pressure of the vacuum state is lower than the first pressure of the external air and equal to or greater than $10^{-3}$ Torr.

* * * * *